United States Patent [19]

Pfaendner et al.

[11] Patent Number: 5,807,932
[45] Date of Patent: Sep. 15, 1998

[54] INCREASING THE MOLECULAR WEIGHT OF POLYCONDENSATES

[75] Inventors: Rudolf Pfaendner, Rimbach; Kurt Hoffmann, Wachenheim; Heinz Herbst, Lautertal, all of Germany

[73] Assignee: Ciba Specialty Chemicals Corporation, Tarrytown, N.Y.

[21] Appl. No.: 817,081

[22] PCT Filed: Oct. 5, 1995

[86] PCT No.: PCT/EP95/03937

§ 371 Date: Apr. 9, 1997

§ 102(e) Date: Apr. 9, 1997

[87] PCT Pub. No.: WO96/11978

PCT Pub. Date: Apr. 25, 1996

[30] Foreign Application Priority Data

Oct. 14, 1994 [CH] Switzerland ............................. 3090/94

[51] Int. Cl.$^6$ .......................... C08G 63/80; C08G 64/20; C08G 69/06
[52] U.S. Cl. .......................... 525/423; 525/177; 525/184; 525/420; 525/424; 525/426; 525/437; 525/438; 525/439; 525/440; 525/444; 525/445; 525/462; 525/463; 525/467; 525/468; 521/48; 521/49.8
[58] Field of Search ...................... 525/420, 423, 525/437, 438, 462, 463, 424, 426, 467, 468, 440, 445; 521/48, 49.8

[56] References Cited

U.S. PATENT DOCUMENTS

| 4,434,276 | 2/1984 | Horlbeck | 525/437 |
| 5,250,619 | 10/1993 | Heinz | 525/92 |
| 5,266,659 | 11/1993 | Sivaram | 525/463 |
| 5,362,783 | 11/1994 | Eiffler | 524/154 |
| 5,496,920 | 3/1996 | Pfaendner | 528/489 |

FOREIGN PATENT DOCUMENTS

| 2111905 | 6/1994 | Canada . |
| 0422282 | 4/1991 | European Pat. Off. . |
| 0501545 | 9/1992 | European Pat. Off. . |
| 055953 | 9/1993 | European Pat. Off. . |

*Primary Examiner*—Patricia A. Short
*Attorney, Agent, or Firm*—Luther A. R. Hall; David R. Crichton

[57] ABSTRACT

The invention relates to a process for increasing the molecular weight of polycondensates, which comprises heating a polycondensate in the temperature range below the melting point and above the glass transition temperature in the solid phase of the polymer with additionof at least one sterically hindered hydroxyphenylalkylphosphonic ester or monoester.

14 Claims, No Drawings

INCREASING THE MOLECULAR WEIGHT OF POLYCONDENSATES

The invention relates to a process for increasing the molecular weight of polycondensates and to the polycondensates obtainable by the process.

Polycondensates, such as polyamides, polyesters and polycarbonates, are important engineering plastics with a wide variety of potential uses, for example in the form of films, bottles, fibres and injection mouldings. It is common to these polymers that they are prepared by polycondensation reactions. For technical or kinetic reasons, the synthesis of these polymers frequently does not give high molecular weights. Polymers having high molecular weights are therefore prepared by condensation in the solid phase.

Damage to such polycondensates during processing and use predominantly results, owing to chain cleavage, in polymer fragments containing functional terminal groups. Since the mechanical and physical properties are crucially dependent on the molecular weight of the polymer, high-quality recycling of used polyamides, polyesters and polycarbonates and their production waste, for example from fibre production and injection moulding, is frequently only possible to a restricted extent without aftertreatment owing to the reduced molecular weight.

An improvement in the material properties of used or thermally or hydrolytically predamaged polycondensates is possible in principle. For example, they can be subjected to post-condensation in the solid state [S. Fakirov, Kunststoffe 74, 218 (1984) and R. E. Gruitzner et al., Kunststoffe 82, 284 (1992)]. However, this known method is protracted, and in addition is sensitive to impurities, as may be present in used material.

Furthermore, EP-0 410 230 has proposed carrying out the solid-phase condensation of polyamides using phosphoric acid, phosphorous acid or phosphonous acid as catalyst.

F. Mitterhofer has described studies using a diphosphonite as processing stabilizer in polymer recyclates (C.A. 91, 124534).

EP-A-0 090 915 describes a process for the condensation of poly(alkylene terephthalate) in the solid phase in the presence of esters of phosphorous acid, for example triphenyl phosphite, at from 25° to 65° C. below the melting point of the poly(alkylene terephthalate) while passing a stream of inert gas through the mixture.

The present invention therefore had the object of developing a process for post-condensation in the solid phase which allows an increase in the molecular weight of polycondensate, such as polyesters, polyamides and polycarbonates, and of corresponding copolymers and blends in a relatively short time and/or improves the properties of the polycondensate.

The invention thus relates to a process for increasing the molecular weight of polycondensates, which comprises heating a polycondensate in the temperature range below the melting point and above the glass transition temperature in the solid phase of the polymer with addition of at least one sterically hindered hydroxyphenylalkylphosphonic ester or monoester.

This increase in molecular weight results in an improvement in the properties of the polycondensates, which becomes evident, for example, in the injection-moulding sector, extrusion sector and in particular in recyclates. With the aid of the novel process, an increase in molecular weight can be achieved, in particular, in polycondensate recyclates from the collection of used industrial parts, for example from automobile and electrical applications. This allows recyclates to be re-used for high-quality applications, for example as high-performance fibres, injection mouldings, extrusion applications or foams. Such recyclates also originate, for example, from industrial or domestic collections of valuable materials, from production waste, for example from fibre production and trimmings, or return obligations, for example collections of PET drinks bottles.

The invention also relates to a process for increasing the molecular weight of polycondensates, which comprises heating a polycondensate in the temperature range below the melting point and above the glass transition temperature in the solid phase of the polymer with addition of at least one sterically hindered hydroxyphenylalkylphosphonic ester or monoester and in the presence of at least one polyfunctional compound selected from the class consisting of the epoxides, oxazolines, oxazolones, oxazines, isocyanates, ahydrides, acyllactams, maleimides, alcohols, carbodiimides and esters.

The invention furthermore relates to the preparation of branched, crosslinked and partially crosslinked polycondensates. This can be carried out, in particular, by addition of the abovementioned polyfunctional compounds. An insoluble polycondensate is obtained which can be used, for example, for the production of foams.

The polycondensate is preferably a recycled polycondensate.

The novel process is of particular interest when the polycondensate is a polyamide, a polyester, a polycarbonate or a copolymer thereof.

Besides polyesters, polyamides and polycarbonates, the present invention also covers the corresponding copolymers and blends, for example PBT/PS, PBT/ASA, PBT/ABS, PBT/PC, PET/ABS, PET/PC, PBT/PET/PC, PBT/PET, PA/PP, PA/PE and PA/ABS. However, it must be taken into account that the novel process, like all methods allowing exchange reactions between the blend components, can result in a modification of the blend, i.e. in the formation of copolymeric structures.

The term polyamides, i.e. both fresh polyamides and recycled polyamides, is taken to mean aliphatic and aromatic polyamides or copolyamides derived from diamines and dicarboxylic acids and/or from amino carboxylic acids or the corresponding lactams. Examples of suitable polyamides are: PA 6, PA 11, PA 12, PA 46, PA 66, PA 69, PA 610, PA 612, PA 10.12, PA 12.12, and amorphous polyamides of the Trogamid PA 6-3-T and Grilamide TR 55 type. Polyamides of this type are known in general terms and are commercially available.

The polyamides are preferably crystalline or partially crystalline polyamides and in particular are PA 6 and PA 6.6 or mixtures thereof, and recyclates or copolymers based thereon.

Polyesters, i.e. both fresh polyesters and recycled polyesters, can be homopolyesters or copolyesters built up from aliphatic, cycloaliphatic or aromatic dicarboxylic acids and diols or hydroxycarboxylic acids.

The aliphatic dicarboxylic acids can contain from 2 to 40 carbon atoms, the cycloaliphatic dicarboxylic acids can contain from 6 to 10 carbon atoms, the aromatic dicarboxylic acids can contain from 8 to 14 carbon atoms, the aliphatic hydroxycarboxylic acids can contain from 2 to 12 carbon atoms and the aromatic and cycloaliphatic hydroxycarboxylic acids can contain from 7 to 14 carbon atoms.

The aliphatic diols can contain from 2 to 12 carbon atoms, the cycloaliphatic diols can contain from 5 to 8 carbon atoms and the aromatic diols can contain from 6 to 16 carbon atoms.

The term aromatic diols is taken to mean diols in which two hydroxyl groups are bonded to one or to different aromatic hydrocarbon radicals.

It is furthermore possible for the polyesters to be branched by small amounts, for example 0.1 to 3 mol %, based on the dicarboxylic acids present, of monomers having a functionality of greater than two (for example pentaerythritol, trimellitic acid, 1,3,5-tri-(hydroxyphenyl) benzene, 2,4-dihydroxybenzoic acid or 2-(4-hydroxyphenyl)-2-(2,4-dihydroxyphenyl)propane).

In polyesters comprising at least two monomers, the latter can be randomly distributed or arranged in the form of blocks.

Suitable dicarboxylic acids are linear and branched, saturated, aliphatic dicarboxylic acids, aromatic dicarboxylic acids and cycloaliphatic dicarboxylic acids.

Suitable aliphatic dicarboxylic acids are those having from 2 to 40 carbon atoms, for example oxalic acid, malonic acid, dimethylmalonic acid, succinic acid, pimelic acid, adipic acid, trimethyladipic acid, sebacic acid, azelaic and dimeric acids (products of the dimerization of unsaturated, aliphatic carboxylic acids, such as oleic acid), and alkylated malonic and succinic acids, such as octadecylsuccinic acid.

Suitable cycloaliphatic dicarboxylic acids are 1,3-cyclobutanedicarboxylic acid, 1,3-cyclopentanedicarboxylic acid, 1,3- and 1,4-cyclohexanedicarboxylic acid, 1,3- and 1,4-(dicarboxymethyl)cyclohexane and 4,4'-dicyclohexyldicarboxylic acid.

Suitable aromatic dicarboxylic acids are in particular terephthalic acid, isophthalic acid, o-phthalic acid, 1,3-, 1,4-, 2,6- and 2,7-naphthalenedicarboxylic acid, 4,4'-biphenyldicarboxylic acid, di(4-carboxyphenyl)sulfone, 4,4'-benzophenonedicarboxylic acid, 1,1,3-trimethyl-5-carboxy-3-(p-carboxyphenyl)indane, di(4-carboxyphenyl) ether, bis(p-carboxyphenyl)methane and bis(p-carboxyphenyl)ethane.

Preference is given to aromatic dicarboxylic acids, in particular terephthalic acid, isophthalic acid and 2,6-naphthalenedicarboxylic acid.

Further suitable dicarboxylic acids are those containing —CO—NH— groups; they are described in DE-A-2 414 349. Also suitable are dicarboxylic acids containing N-heterocyclic rings, for example those derived from carboxyalkylated, carboxyphenylated or carboxybenzylated monoamino-s-triazinedicarboxylic acids (cf. DE-A 2 121 184 and 2 533 675), mono- or bishydantoins, halogenated or unhalogenated benzimidazoles or parabanic acid. The carboxyalkyl groups in these compounds can contain from 3 to 20 carbon atoms.

Suitable aliphatic diols are linear and branched aliphatic glycols, in particular those having from 2 to 12, in particular from 2 to 6, carbon atoms in a molecule, for example ethylene glycol, 1,2- and 1,3-propylene glycol, 1,2-, 1,3-, 2,3- and 1,4-butanediol, pentyl glycol, neopentyl glycol, 1,6-hexanediol and 1,12-dodecanediol. An example of a suitable cycloaliphatic diol is 1,4-dihydroxycyclohexane. Further suitable aliphatic diols are, for example, 1,4-bis(hydroxymethyl)cyclohexane, aromatic-aliphatic diols, such as p-xylylene glycol and 2,5-dichloro-p-xylylene glycol, 2,2-(β-hydroxyethoxyphenyl)propane and polyoxyalkylene glycols, such as diethylene glycol, triethylene glycol, polyethylene glycol and polypropylene glycol. The alkylenediols are preferably linear and contain, in particular, from 2 to 4 carbon atoms.

Preferred diols are alkylenediols, 1,4-dihydroxycyclohexane and 1,4-bis(hydroxymethyl) cyclohexane. Particular preference is given to ethylene glycol, 1,4-butanediol and 1,2- and 1,3-propylene glycol.

Further suitable aliphatic diols are β-hydroxyalkylated, in particular β-hydroxyethylated bisphenols, such as 2,2-bis[4'-(β-hydroxyethoxy)phenyl]propane. Futher bisphenols are given below.

A further group of suitable aliphatic diols comprises the heterocyclic diols described in DE-A 1 812 003, 2 342 432, 2 342 372 and 2 453 326. Examples are N,N'-bis(β-hydroxyethyl)-5,5-dimethylhydantoin, N,N'-bis(β-hydroxypropyl)-5,5-dimethylhydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl)benzimidazolone, N,N'-bis(β-hydroxyethyl)tetrachlorobenzimidazolone and N,N'-bis(β-hydroxyethyl)tetrabromobenzimidazolone.

Suitable aromatic diols are monocyclic diphenols and in particular bicyclic diphenols carrying a hydroxyl group on each aromatic ring. The term aromatic is preferably taken to mean hydrocarbon-aromatic radicals, for example phenylene or naphthylene. Besides, for example, hydroquinone, resorcinol and 1,5-, 2,6- and 2,7-dihydroxynaphthalene, particular mention should be made of the bisphenols which can be described by the following formulae:

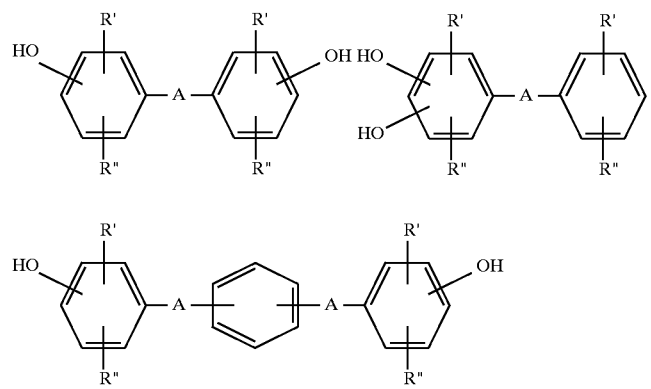

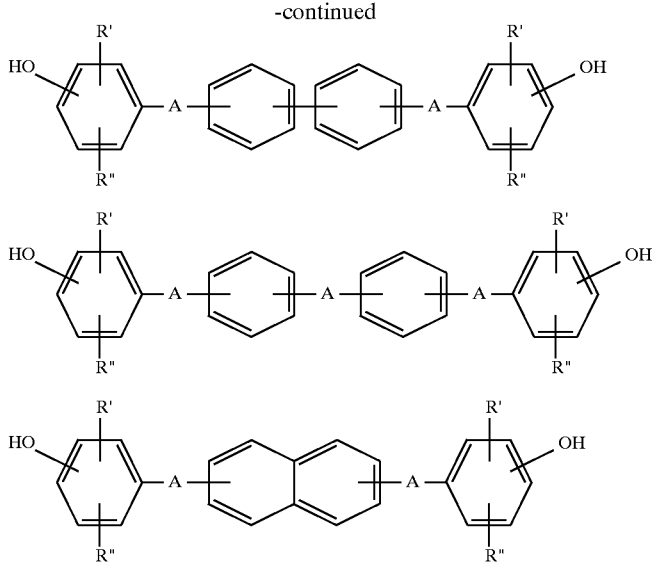

The hydroxyl groups can be in the m-position, but in particular in the p-position, R' and R" in these formulae can be alkyl having 1 to 6 carbon atoms, halogen, such as chlorine or bromine, or in particular hydrogen, and A can be a direct bond or —O—, —S—, —(O)S(O)—, —C(O)—, —P(O)(C$_1$–C$_{20}$alkyl)—, substituted or unsubstituted alkylidene, cycloalkylidene or alkylene.

Examples of substituted or unsubstituted alkylidene are ethylidene, 1,1- and 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are bis(p-hydroxyphenyl)ether and thioether, bis(p-hydroxyphenyl)sulfone, bis(p-hydroxyphenyl)methane, bis(4-hydroxyphenyl)-2,2'-biphenyl, phenylhydroquinone, 1,2-bis(p-hydroxyphenyl)ethane, 1-phenylbis(p-hydroxyphenyl)methane, diphenylbis(p-hydroxyphenyl)methane, diphenylbis(p-hydroxyphenyl)ethane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- and 2,2-bis(p-hydroxyphenyl)butane, 2,2-bis(p-hydroxyphenyl) hexafluoropropane, 1,1-dichloro- and 1,1,1-trichloro-2,2-bis(p-hydroxyphenyl)ethane, 1,1-bis(p-hydroxyphenyl) cyclopentane and in particular 2,2-bis(p-hydroxyphenyl) propane (bisphenol A) and 1,1-bis(p-hydroxyphenyl) cyclohexane (bisphenol C).

Suitable polyesters of hydroxycarboxylic acids are, for example, polycaprolactone, polypivalolactone and the polyesters of 4-hydroxycyclohexanecarboxylic acid and 4-hydroxybenzoic acid.

Also suitable are polymers containing predominantly ester bonds, but which can also contain other bonds, for example polyester amides and polyesterimides.

Polyesters with aromatic dicarboxylic acids have achieved the greatest importance, in particular the polyalkylene terephthalates. Preference is therefore given to novel moulding compositions in which the polyester is built up from at least 30 mol %, preferably at least 40 mol %, of aromatic dicarboxylic acids and at least 30 mol %, preferably at least 40 mol %, of alkylenediols, preferably having from 2 to 12 carbon atoms, based on the polyester.

In this case, the alkylenediol is in particular linear and contains from 2 to 6 carbon atoms, for example ethylene glycol, trimethylene glycol, tetramethylene glycol and hexamethylene glycol, and the aromatic dicarboxylic acid is in particular terephthalic acid and/or isophthalic acid.

The novel process is likewise of particular interest when the polycondensate is a polyester.

Particularly suitable polyesters are PET, PBT and corresponding copolymers, especial preference being given to PET and its copolymers. The process also achieves particular importance in the case of PET recyclates, which are obtained, for example, from bottle collections, for example collections by the drinks industry. These materials preferably comprise terephthalic acid, 2,6-naphthalenedicarboxylic acid and/or isophthalic acid in combination with ethylene glycol and/or 1,4-bis (hydroxymethyl)cyclohexane.

The term polycarbonate (PC) is taken to mean both fresh polycarbonate and recycled polycarbonate. PC is obtained, for example, from bisphenol A and phosgene or a phosgene analogue, such as trichloromethyl chloroformate, triphosgene or diphenyl carbonate, by condensation, in the latter case generally with addition of a suitable transesterification catalyst, for example a borohydride, an amine, such as 2-methylimidazole or a quaternary ammonium salt; besides bisphenol A, other bisphenol components can be used in addition, and monomers which are halogenated on the benzene ring can also be employed. Particularly suitable bisphenol components which may be mentioned are 2,2-bis (4'-hydroxyphenyl)propane (bisphenol A), 2,4'-dihydroxydiphenylmethane, bis(2-hydroxyphenyl)methane, bis(4-hydroxyphenyl)methane, bis(4-hydroxy-5-propylphenyl)methane, 1,1-bis(4'-hydroxyphenyl)ethane, bis(4-hydroxyphenyl)cyclohexylmethane, 2,2-bis(4'-hydroxyphenyl)-1-phenylpropane, 2,2-bis(3',5'-dimethyl-4'-hydroxyphenyl)propane, 2,2-bis(3',5'-dibromo-4'-hydroxyphenyl)propane, 2,2-bis(3',5'-dichloro-4'-hydroxyphenyl)propane, 1,1-bis(4'-hydroxyphenyl) cyclododecane, 1,1-bis(3',5'-dimethyl-4'-hydroxyphenyl) cyclododecane, 1,1-bis(4'-hydroxyphenyl)-3,3,5-trimethylcyclohexane, 1,1-bis(4'-hydroxyphenyl)-3,3,5,5- tetramethylcyclohexane, 1,1-bis(4'-hydroxyphenyl)-3,3,5-trimethylcyclopentane and the bisphenols mentioned above. The polycarbonates may furthermore be branched by small amounts of monomers having a functionality of more than two (examples as given above for the polyesters).

The novel process is also of particular interest when the polycondensate is a polycarbonate.

The polycondensate copolymers or blends which can be used in the novel process are prepared in a conventional manner from the starting polymers. The polyester component is preferably PBT and the PC component is preferably a PC based on bisphenol A. The polyester:PC ratio is preferably from 95:5 to 5:95, a ratio in which one component makes up at least 75% being particularly preferred.

The invention achieves particular importance in the case of recycled polycondensates, as obtained from production waste, valuable material collections or return obligations, for example in the automobile industry or in the electrical sector. Here, the recycled polycondensates are thermally and/or hydrolytically damaged in a variety of ways. In addition, these recyclates can also contain minor amounts of admixed plastics having different structures, for example polyolefins, polyurethanes, ABS or PVC. These recyclates can also contain usual impurities, for example residues of dyes, adhesives, contact media or paints, traces of metal, traces of water, traces of oils and greases or inorganic salts.

Sterically hindered hydroxyphenylalkylphosphonic esters and monoesters have been disclosed, for example, in U.S. Pat. No. 4,778,840 and are, for example, compounds of the formula I

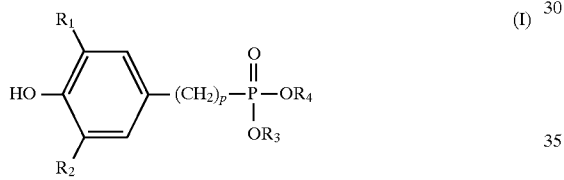

in which
R$^1$ is isopropyl, tert-butyl, cyclohexyl or cyclohexyl which is substituted by 1–3 $C_1$–$C_4$-alkyl groups,
R$_2$ is hydrogen, $C_1$–$C_4$alkyl, cyclohexyl or cyclohexyl which is substituted by 1–3 $C_1$–$C_4$-alkyl groups,
R$_3$ is $C_1$–$C_{20}$alkyl, or unsubstituted or $C_1$–$C_4$alkyl-substituted phenyl or naphthyl,
R$_4$ is hydrogen, $C_1$–$C_{20}$alkyl, unsubstituted or $C_1$–$C_4$alkyl-substituted phenyl or naphthyl;
or is $$\frac{M^{r+}}{r},$$

$M^{r+}$ is an r-valent metal cation,
n is 1,2,3,4,5 or 6, and
r is 1,2 or 3.

$C_1$–$C_{20}$alkyl substituents are radicals such as methyl, ethyl, propyl, butyl, pentyl, hexyl, octyl, stearyl or corresponding branched isomers; $C_2$–$C_4$alkyl radicals are preferred.

$C_1$–$C_4$alkyl-substituted phenyl or naphthyl, which preferably contains 1 to 3, in particular 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butylnaphthyl.

$C_1$–$C_4$alkyl-substituted cyclohexyl, which preferably contains 1 to 3, in particular 1 or 2, branched or unbranched alkyl radicals, is, for example, cyclopentyl, methylcyclopentyl, dimethylcyclopentyl, cyclohexyl, methylcyclohexyl, dimethylcyclohexyl, trimethylcyclohexyl or tert-butylcyclohexyl.

A monovalent, divalent or trivalent metal cation is preferably an alkali metal cation, alkaline earth metal cation, heavy-metal cation or aluminium cation, for example Na$^+$, K$^+$, Mg$^{++}$, Ca$^{++}$, Ba$^{++}$, Zn$^{++}$ or Al$^{+++}$. Particular preference is given to Ca$^{++}$.

Preferred compounds of the formula I are those which contain at least one tert-butyl group as R$_1$ or R$_2$. Very particular preference is given to compounds in which R$_1$ and R$_2$ are simultaneously tert-butyl.

n is preferably 1 or 2, very particularly preferably 1.

Very particularly preferred sterically hindered hydroxyphenylalkylphosphonic esters and monoesters are the compounds of the formula II and III.

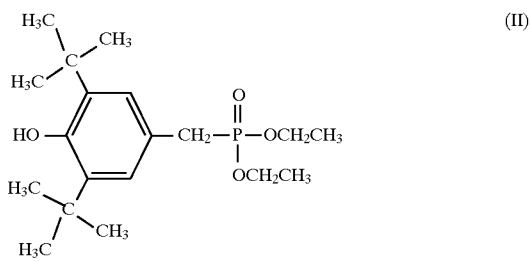

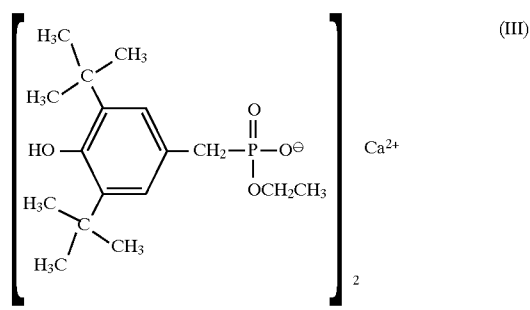

The compound of the formula II is commercially available as Irganox® 1222 (Ciba-Geigy) and that of the formula III is commercially available as Irganox® 425 (Ciba-Geigy).

Based on 100 parts of polycondensate, preferably from 0.01 to 5 parts, particularly preferably from 0.02 to 2 parts, in particular from 0.05 to 1 part, of a sterically hindered hydroxyphenylalkylphosphonic ester or monoester are employed.

Polyfunctional, in particular difunctional, compounds from the epoxide class in the sense of this invention can have an aliphatic, aromatic, cycloaliphatic, araliphatic or heterocyclic structure; they contain epoxide groups as side groups or these groups form part of an alicyclic or heterocyclic ring system. The epoxide groups are preferably bonded to the remainder of the molecule as glycidyl groups via ether or ester bonds, or the compounds are N-glycidyl derivatives of heterocyclic amines, amides or imides. Epoxides of these types are known in general terms and are commercially available.

The epoxides contain, for example, two epoxide radicals, for example those of the formula IV

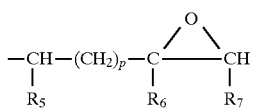

(IV)

in which, when $R_5$ and $R_7$ are hydrogen, $R_6$ is hydrogen or methyl and p=0; or, when $R_5$ and $R_7$ together are —CH$_2$—CH$_2$— or —CH$_2$—CH$_2$—CH$_2$—, $R_6$ is hydrogen and p=0 or 1, where these radicals are bonded directly to carbon, oxygen, nitrogen or sulfur atoms.

Examples of epoxides which may be mentioned are:

1. Diglycidyl and di(β-methylglycidyl)esters obtainable by reacting a compound containing two carboxyl groups in the molecule and epichlorohydrin or glycerol dichlorohydrin or β-methylepichlorohydrin. The reaction is preferably carried out in the presence of bases.

The compounds containing two carboxyl groups in the molecule can be aliphatic dicarboxylic acids. Examples of these dicarboxylic acids are glutaric acid, adipic acid, pimelic acid, suberic acid, azelaic acid, sebacic acid or dimerized or trimerized linoleic acid.

However, it is also possible to employ cycloaliphatic dicarboxylic acids, for example tetrahydrophthalic acid, 4-methyltetrahydrophthalic acid, hexahydrophthalic acid or 4-methylhexahydrophthalic acid.

It is also possible to use aromatic dicarboxylic acids, for example phthalic acid or isophthalic acid.

2. Diglycidyl or di(β-methylglycidyl)ethers obtainable by reacting a compound containing two free alcoholic hydroxyl groups and/or phenolic hydroxyl groups and a suitably substituted epichlorohydrin under alkaline conditions or in the presence of an acid catalyst followed by alkali treatment.

Ethers of this type are derived, for example, from acyclic alcohols, such as ethylene glycol, diethylene glycol and higher poly(oxyethylene)glycols, propane-1,2-diol, or poly(oxypropylene)glycols, propane-1,3-diol, butane-1,4-diol, poly(oxytetramethylene)glycols, pentane-1,5-diol, hexane-1,6-diol, sorbitol and from polyepichlorohydrins.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they contain aromatic rings, such as N,N-bis(2-hydroxyethyl)aniline or p,p'-bis(2-hydroxyethylamino)diphenylmethane.

The epoxide compounds can also be derived from monocyclic phenols, for example from resorcinol, pyrocatechol or hydroquinone; or they are based on polycyclic phenols, for example on 4,4'-dihydroxybiphenyl, bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone, 9,9'-bis(4-hydroxyphenyl)fluorene, or on condensation products of phenols with formaldehyde obtained under acid conditions, such as phenol novolaks.

3. Di(N-glycidyl) compounds are obtainable, for example, by dehydrochlorinating the products of the reaction of epichlorohydrin with amines containing two amino hydrogen atoms. These amines are, for example, aniline, toluidine, n-butylamine, bis(4-aminophenyl)methane, m-xylylenediamine or bis(4-methylaminophenyl)methane.

However, the di(N-glycidyl) compounds also include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin.

4. Di(S-glycidyl) compounds, such as di-S-glycidyl derivatives derived from dithiols, for example ethane-1,2-dithiol or bis(4-mercaptomethylphenyl)ether.

5. Epoxides containing a radical of the formula IV in which $R_5$ and $R_7$ together are —CH$_2$—CH$_2$— and n is 0, for example bis(2,3-epoxycyclopentyl)ether, 2,3-epoxycyclopentyl glycidyl ether or 1,2-bis(2,3-epoxycyclopentoxy)ethane; epoxides containing a radical of the formula IV in which $R_5$ and $R_7$ together are —CH$_2$—CH$_2$— and n is 1, for example (3',4'-epoxy-6'-methylcyclohexyl)methyl 3,4-epoxy-6-methylcyclohexanecarboxylate.

The abovementioned difunctional epoxides can, for example owing to the production process, contain small amounts of monofunctional or trifunctional components.

Predominant use is made of diglycidyl compounds containing aromatic structures.

It may also be possible to employ a mixture of epoxides having different structures.

On the other hand, trifunctional and polyfunctional epoxides can be added in addition to give branches if desired. Such epoxides are, for example, a) liquid bisphenol A diglycidyl ethers, such as Araldit®GY 240, Araldit®GY 250, Araldit®GY 260, Araldit®GY 266, Araldit®GY 2600, Araldit®GY 790; b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610; c) liquid bisphenol F diglycidyl ethers, such as Araldit®GY 281, Araldit®GY 282, Araldit®PY 302, Araldit®PY 306; d) solid polyglycidyl ethers of tetraphenylethane, such as CG Epoxy Resin®0163; e) solid and liquid polyglycidyl ethers of phenol-formaldehyde novolak, such as EPN 1138, EPN 1139, GY 1180, PY 307; f) solid and liquid polyglycidyl ethers of o-cresol-formaldehyde novolak, such as ECN 1235, ECN 1273, ECN 1280, ECN 1299; g) liquid glycidyl ethers of alcohols, such as Shell® glycidyl ether 162, Araldit®DY 0390, Araldit®DY 039 1; h) liquid glycidylesters of carboxylic acids, such as Shell®Cardura E terephthalates, trimellitates, Araldit®PY 284 or mixtures of aromatic glycidyl esters, for example Araldit®PT 910; i) solid heterocyclic epoxy resins (triglycidyl isocyanurate), such as Araldit®PT 810; j) liquid cycloaliphatic epoxy resins, such as Araldit®CY 179; k) liquid N,N,O-triglycidyl ethers of p-aminophenol, such as Araldit®MY 0510; l) tetraglycidyl-4-4'-methylenebenzamine or N,N,N',N'-tetraglycidyl diaminophenylmethane, such as Araldit®MY 720 and Araldit®MY 721.

The difunctional epoxides are particularly preferably diglycidyl ethers based on bisphenols, for example on 2,2-bis(4-hydroxyphenyl)propane (bisphenol A), bis(4-hydroxyphenyl)sulfone (bisphenol S) or mixtures of bis(ortho/para-hydroxyphenyl)methane (bisphenol F).

Very particular preference is given to solid epoxides of the bisphenol A diglycidyl ether type, for example Araldit® GT 6071, GT 7071, GT 7072, GT 6097 and GT 6099 or liquid epoxides of the bisphenol F type, such as Araldit® GY 281 or PY 306.

Based on 100 parts of polycondensate, preferably from 0.01 to 5 parts, particularly preferably from 0.02 to 2 parts, in particular from 0.05 to 1 part, of a diepoxide are employed.

Polyfunctional, in particular trifunctional, compounds from the oxazoline class in the sense of this invention are known and are described, for example, in EP-A-0 583 807 and are, for example, compounds of the formula V

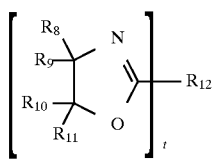

in which $R_8$, $R_9$, $R_{10}$ and $R_{11}$, independently of one another, are hydrogen, halogen, $C_1$–$C_{20}$alkyl, $C_4$–$C_{15}$cycloalkyl, unsubstituted or $C_1$–$C_4$alkyl-substituted phenyl, $C_1$–$C_{20}$-alkoxy or $C_2$–$C_{20}$carboxyalkyl, if t=3, $R_{12}$ is a trivalent linear, branched or cyclic aliphatic radical having 1 to 18 carbon atoms, which may be interrupted by oxygen, sulfur or

or $R_{12}$ is furthermore an unsubstituted or $C_1$–$C_4$alkyl-substituted benzenetriyl radical, if t=2, $R_{12}$ is a divalent linear, branched or cyclic aliphatic radical having 1 to 18 carbon atoms. which may be interrupted by oxygen, sulfur or

or $R_{12}$ is furthermore an unsubstituted or $C_1$–$C_4$alkyl-substituted phenylene radical, $R_{13}$ is $C_1$–$C_8$alkyl, and t is 2 or 3.

Halogen is, for example, fluorine, chlorine, bromine or iodine, particularly preferably chlorine.

$C_1$–$C_{20}$alkyl is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. A preferred meaning of $R_8$, $R_9$, $R_{10}$ and $R_{11}$ is $C_1$–$C_{12}$alkyl, in particular $C_1$–$C_8$alkyl, for example $C_1$–$C_4$alkyl.

$C_4$–$C_{15}$cycloalkyl, in particular $C_5$–$C_{12}$cycloalkyl, is, for example, cyclobutyl, cyclopentyl, cyclohexyl, cycloheptyl, cyclooctyl or cyclododecyl. Preference is given to $C_5$–$C_8$cycloalkyl, in particular cyclohexyl.

$C_1$–$C_4$alkyl-substituted phenyl which preferably contains 1 to 3, in particular 1 or 2, alkyl groups is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_1$–$C_{20}$alkoxy is a branched or unbranched radical, for example methoxy, ethoxy, propoxy, isopropoxy, n-butoxy, isobutoxy, pentoxy, isopentoxy, hexyloxy, heptyloxy, octyloxy, decyloxy, tetradecyloxy, hexadecyloxy or octadecyloxy. A preferred meaning of $R_8$, $R_9$, $R_{10}$ and $R_{11}$ is $C_1$–$C_{12}$alkoxy, in particular $C_1$–$C_8$alkoxy, for example $C_1$–$C_4$alkoxy.

$C_2$–$C_{20}$Carboxyalkyl is a branched or unbranched radical, for example carboxymethyl, carboxyethyl, carboxypropyl, carboxybutyl, carboxypentyl, carboxyhexyl, carboxyheptyl, carboxyoctyl, carboxynonyl, carboxydecyl, carboxyundecyl, carboxydodecyl, 2-carboxy-1-propyl, 2-carboxy-1-butyl or 2-carboxy-1-pentyl. A preferred meaning of $R_8$, $R_9$, $R_{10}$ and $R_{11}$ is $C_2$–$C_{12}$carboxyalkyl, in particular $C_2$-$C_8$carboxyalkyl, for example $C_2$–$C_4$carboxyalkyl.

A trivalent linear, branched or cyclic aliphatic radical having 1 to 18 carbon atoms, which may be interrupted by oxygen, sulfur or

means that the three bonds may be on the same or on different atoms. Examples thereof are methanetriyl, 1,1,1-ethanetriyl, 1,1,1-propanetriyl, 1,1,1-butanetriyl, 1,1,1-pentanetriyl, 1,1,1-hexanetriyl, 1,1,1-heptanetriyl, 1,1,1-octanetriyl, 1,1,1-nonanetriyl, 1,1,1-decanetriyl, 1,1,1-undecanetriyl, 1,1,1-dodecanetriyl, 1,2,3-propanetriyl, 1,2,3-butanetriyl, 1,2,3-pentanetriyl, 1,2,3-hexanetriyl, 1,1,3-cyclopentanetriyl, 1,3,5-cyclohexanetriyl, 3-oxo-1,1,5-pentanetriyl, 3-thio-1,1,5-pentanetriyl or 3-methylamino-1,1,5-pentanetriyl.

A divalent linear, branched or cyclic aliphatic radical having 1 to 18 carbon atoms, which may be interrupted by oxygen, sulfur or

means that the two bonds may be on the same or on different atoms. Examples thereof are methylene, ethylene, propylene, butylene, pentylene, hexylene, heptylene, octylene, nonylene, decylene, undecylene or dodecyclene.

Unsubstituted or $C_1$–$C_4$alkyl-substituted benzenetriyl, which preferably contains 1 to 3, in particular 1 or 2, alkyl groups, is, for example, 1,2,4-benzenetriyl, 1,3,5-benzenetriyl, 3-methyl-1,2,4-benzenetriyl or 2-methyl-1,3,5-benzenetriyl. Particular preference is given to 1,2,4-benzenetriyl and 1,3,5-benzenetriyl.

Of particular interest are compounds of the formula V in which $R_8$, $R_9$, $R_{10}$ and $R_{11}$, indepednently of one another, are hydrogen or $C_1$–$C_4$alkyl, and $R_{12}$ is 1,2,4-benzenetriyl or 1,3,5-benzenetriyl.

Of especial interest are compounds of the formula V, for example 2,2',2"-(1,3,5-benzenetriyl)tris-2-oxazoline; 2,2',2"-(1,2,4-benzenetriyl)tris-4,4-dimethyl-2-oxazoline; 2,2',2"-(1,3,5-benzenetriyl)tris-4,4-dimethyl-2-oxazoline; 2,2',2"-(1,2,4-benzenetriyl)tris-5-methyl-2-oxazoline; or 2,2',2"-(1,3,5-benzenetriyl)tris-5-methyl-2-oxazoline.

Preferred difunctional compounds from the bisoxazoline class in the sense of this invention have been described by T. Loontjens et al., Makromol. Chem., Macromol. Symp. 75, 211–216 (1993) and are, for example, compounds of the formula

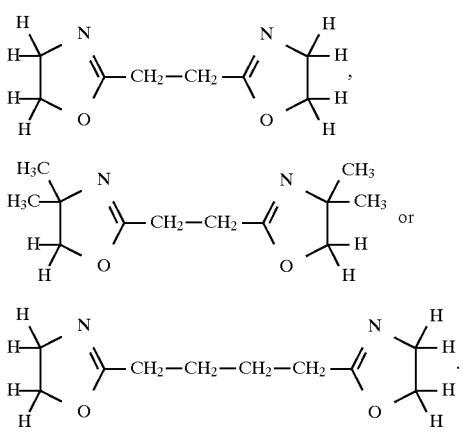

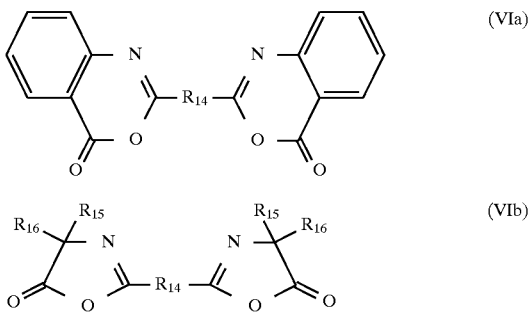

Based on 100 parts of polycondensate, preferably from 0.01 to 5 parts, particularly preferably from 0.02 to 2 parts, in particular from 0.05 to 1 part, of an oxazoline are employed. Further preferred bisoxazolines are described in F. Böhme et al., Die Angewandte Makro-molekulare Chemie 224, 167–178 (1995) and in DE-A-4 140 333.

Polyfunctional, in particular difunctional, compounds from the oxazine or oxazolone class in the sense of this invention are known and have been described, for example, by H. Inata et al., J. Applied Polymer Science Vol. 32, 4581–4594 (1986) and are, for example, compounds of the formula VIa or VIb

in which

R$_{14}$ is a direct bond or unsubstituted or C$_1$–C$_4$alkyl-substituted phenylene, and R$_{15}$ and R$_{16}$, independently of one another, are hydrogen or C$_1$–C$_4$alkyl.

Special preference is given to compounds of the formula VIa and VIb in which R$_{14}$ is a direct bond, in particular 2,2'-bis(4H-3,1-benzoxazin-4-one).

Based on 100 parts of polycondensate, preferably from 0.01 to 5 parts, particularly preferably from 0.02 to 2 parts, in particular from 0.05 to 1 part, of an oxazine or oxazolone are employed.

Polyfunctional, in particular difunctional, compounds from the isocyanate class in the sense of this invention are known and are, for example, compounds of the formula VII

in which R$_{23}$ is C$_1$–C$_{20}$alkylene or polymethylene, arylene, aralkylene or cycloalkylene.

Preferred diisocyanates are tetramethylene diisocyanate, hexamethylene diisocyanate, dodecamethylene diisocyanate, eicosane 1,20-diisocyanate, 4-butylhexamethylene diisocyanate, 2,2,4- and 2,4,4-trimethylhexamethylene diisocyanate, OCN(CH$_2$)$_2$O(CH$_2$)$_2$NCO, toluene 2,4-diisocyanate, p-phenylene diisocyanate, xylylene diisocyanates, 3-isocyanatomethyl-3,5,5-trimethylcyclohexyl isocyanate, naphthalene diisocyanates, sulfonyl diisocyanates, 3,3'-, 4,4'- and 3,4'-diisocyanates of diphenylmethane, 2,2-diphenylpropane and diphenyl ether, 3,3'-dimethyl-4,4'-diisocyanatobiphenyl, 3,3'-dimethoxy-4,4'-diisocyanatobiphenyl and 4,4'-diisocyanatodiphenylmethane.

These diisocyanates are commercially available or can be prepared from commercially available amines.

However, it is also possible to employ diisocyanate generators, such as polymeric urethanes, uretdione dimers and higher oligomers, cyanurate polymers, urethanes and polymeric urethanes of cyanurate polymers and thermally dissociatable adducts of schiff's bases.

Based on 100 parts of polycondensate, preferably from 0.01 to 5 parts, particularly preferably from 0.02 to 2 parts, in particular from 0.05 to 1 part, of an isocyanate are employed.

Polyfunctional, in particular difunctional, compounds from the anhydride class in the sense of this invention are known and are, for example, compounds of the formula VIII

in which R$_{24}$ is a radical of the formulae (VIIIa)–(VIIIj)

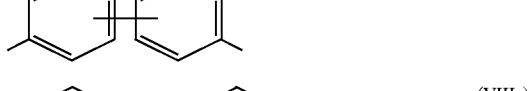

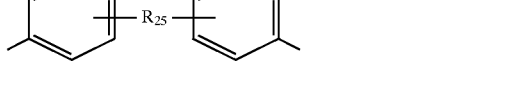

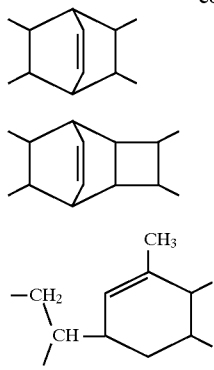

(VIIIh)

(VIIIi)

(VIIIj)

in which $R_{25}$ is —CH$_2$—, —CH(CH$_3$)—, —C(CH$_3$)$_2$—, —C(CF$_3$)$_2$—, —S—, —O—, —(O)S(O)—, —NHCO—, —CO— or —P(O)(C$_1$–C$_{20}$alkyl)— and in which the aromatic rings in the formulae VIIIa to VIIIe are unsubstituted or substituted by one or more $C_1$–$C_6$alkyl groups, $C_1$–$C_6$alkoxy groups or halogen atoms.

An example of a trifunctional anhydride is mellitic anhydride.

Preference is given to tetracarboxylic dianhydrides containing aromatic rings. These tetracarboxylic anhydrides are commercially available.

It may also be possible to employ a mixture of tetracarboxylic dianhydrides having different structures.

Based on 100 parts of polycondensate, preferably from 0.01 to 5 parts, particularly preferably from 0.02 to 2 parts, in particular from 0.05 to 1 part, of an anhydride are employed.

Polyfunctional, in particular difunctional, compounds from the acyllactam class in the sense of this invention are known and are, for example, compounds of the formula IX

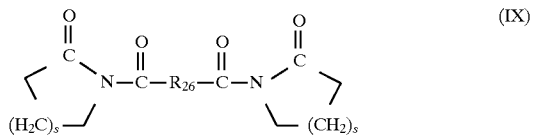

(IX)

in which s is a number from 1 to 16, in particular from 5 to 10, and $R_{26}$ is an aromatic radical, for example one of the formulae:

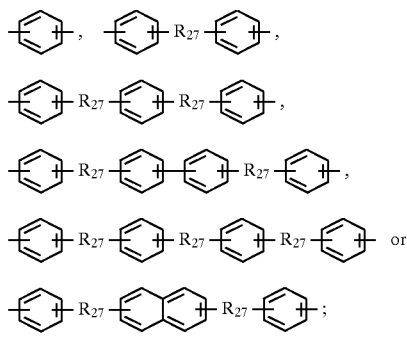

where $R_{27}$ is one of the radicals

—CH$_2$—, —C(O)—, —P(O)(C$_1$–C$_{18}$alkyl)—, —(O)S(O)—, —O— or —S—.

Trifunctional compounds from the acyllactam class in the sense of this invention are known and are, for example, compounds of the formula IXa

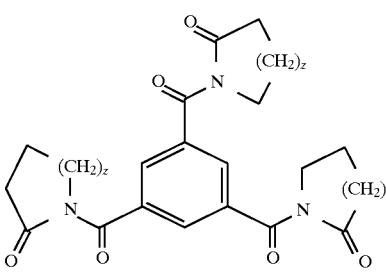

(IXa)

in which z is a number from 1 to 16, in particular from 3 to 9.

Preference is given to trifunctional acyllactams of the formula IXa in which the lactam rings are caprolactam or laurolactam.

Based on 100 parts of polycondensate, preferably from 0.01 to 5 parts, particularly preferably from 0.02 to 2 parts, in particular from 0.05 to 1 part, of an acyllactam are employed.

Polyfunctional, in particular difunctional, compounds from the maleimide class in the sense of this invention are known and are, for example, compounds of the formula X

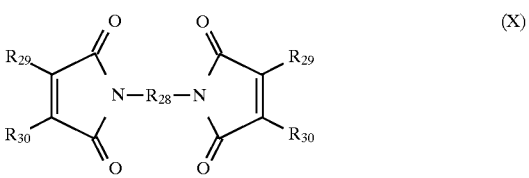

(X)

in which $R_{28}$ is an aliphatic, aromatic, cycloaliphatic or heterocyclic radical; and $R_{29}$ and $R_{30}$, independently of one another, are hydrogen, $C_1$–$C_4$alkyl, $C_1$–$C_6$alkoxy, phenyl or phenoxy.

The aliphatic, aromatic, cycloaliphatic or heterocyclic radicals have a maximum of 40 carbon atoms, can be unsubstituted or substituted, and can also be interrupted by —O—, —S—, —(CH$_2$)$_{1-6}$—, —C(O)—, —P(O)(C$_1$–C$_{18}$alkyl)— or —(O)S(O)— (which represents the radical

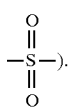

).

Examples of possible substituents are $C_1$–$C_{18}$alkyl, $C_1$–$C_{18}$alkoxy, hydroxyl, phenyl and phenoxy.

An aliphatic radical $R_{28}$ is, for example, a $C_1$–$C_{18}$polymethylene radical, which can be derived from alkyl radicals, such as methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl, or from further branched isomers.

An aromatic radical $R_{28}$ is, for example, a radical having 6–40 carbon atoms, such as phenylene, biphenylene or naphthylene or represents phenylene or biphenylene radicals linked by one of the groups such as —O—, —S—, —(CH$_2$)$_{1-6}$—, —C(O)—, —P(O)(C$_1$–C$_{18}$alkyl)— or —(O)S(O)—.

A cycloaliphatic radical $R_{28}$ is, for example, a radical having 5–10 carbon atoms, such as cyclopentylene, cyclohexylene or cyclooctylene.

A heterocyclic radical $R_{28}$ is, for example, an N-containing 5- or 6-membered ring, such as pyridylene, pyridazylene or pyrazolylene.

$R_{28}$ is preferably an aromatic radical of one of the formulae:

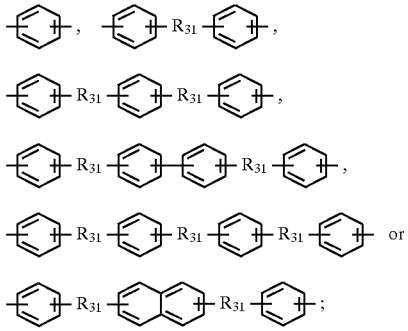

where $R_{31}$ is one of the radicals —$CH_2$—, —C(O)—, —P(O)($C_1$–$C_{18}$alkyl)—, —(O)S(O)—, —O— or —S—.

$R_{29}$ and $R_{30}$, independently of one another, are preferably hydrogen or $C_1$–$C_4$alkyl; $R_{29}$ is particularly preferably hydrogen and $R_{30}$ is particularly preferably hydrogen or methyl; and $R_{29}$ and $R_{30}$ are very particularly preferably hydrogen.

Very particular preference is given to compounds of the formula

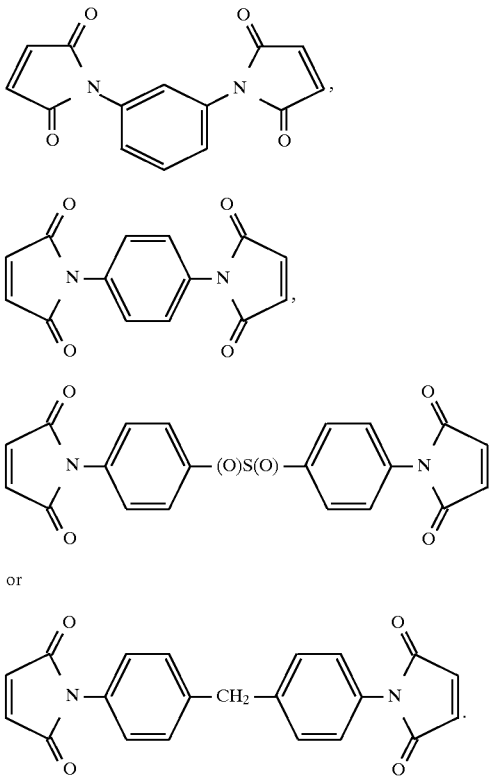

Bismaleimides are obtained by reacting diamines with maleic anhydride, and some are commercially available. Further suitable bismaleimides are described in WO-A-93/24 488 (T. C. Morton et al.).

Based on 100 parts of polycondensate, preferably from 0.01 to 5 parts, particularly preferably from 0.02 to 2 parts, in particular from 0.05 to 1 part, of a maleimide are employed.

Polyfunctional compounds from the alcohol class in the sense of this invention are known and are, for example, pentaerythritol, dipentaerythritol, tripentaerythritol, bistrimethylolpropane, bistrimethylolethane, trismethylolpropane, sorbitol, maltitol, isomaltitol, lactitol, lycasine, mannitol, lactose, leucrose, tris(hydroxyethyl) isocyanurate, palatinitol, tetramethylolcyclohexanol, tetramethylolcyclopentanol, tetramethylolcyclopyranol, glycerol, diglycerol, polyglycerol or 1-0-α-D-glycopyranosyl-D-mannitol dihydrate. Particular preference is given to pentaerythritol, dipentaerythritol and tris (hydroxyethyl)isocyanurate.

Based on 100 parts of polycondensate, preferably from 0.01 to 5 parts, particularly preferably from 0.02 to 2 parts, in particular from 0.05 to 1 part, of a polyfunctional alcohol are employed.

Polyfunctional, in particular difunctional, compounds from the carbodiimide class in the sense of this invention are known and are, for example, compounds of the formula XI

in which $R_{40}$, $R_{41}$ and $R_{42}$, independently of one another, are $C_1$–$C_{12}$alkylene, $C_6$–$C_{13}$cycloalkylene or unsubstituted or $C_1$–$C_4$alkyl-substituted phenylene or naphthylene, $X_1$ and $X_2$, independently of one another, are hydrogen,

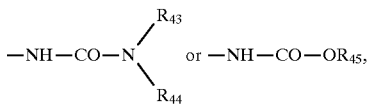

where $R_{43}$, $R_{44}$ and $R_{45}$, independently of one another, are $C_1$–$C_{12}$alkyl, $C_6$–$C_{13}$cycloalkyl or unsubstituted or $C_1$–$C_4$alkyl-substituted phenyl or naphthyl, and v is a number from 0 to 100.

$C_1$–$C_{12}$Alkylene is a branched or unbranched radical, for example methylene, ethylene, propylene, tetramethylene, pentamethylene, hexamethylene, heptamethylene, octamethylene, decamethylene or dodecamethylene. A preferred meaning of $R_{43}$, $R_{44}$ and $R_{45}$ is, for example, $C_2$–$C_{10}$alkylene, in particular $C_2$–$C_8$alkylene.

$C_6$–$C_{13}$Cycloalkylene is a saturated hydrocarbon group having two free valences and containing at least one ring unit and is, for example, cyclohexylene, cycloheptylene or cyclooctylene. Preference is given to cyclohexylene.

Unsubstituted or $C_1$–$C_4$alkyl-substituted phenylene or naphthylene is, for example, 1,2-, 1,3- or 1,4-phenylene or 1,2-, 1,3-, 1,4-, 1,6-, 1,7-, 2,6- or 2,7-naphthylene. 1,4-Phenylene is preferred.

$C_1$–$C_{12}$Alkyl is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl or 1,1,3,3-tetramethylpentyl.

$C_6$–$C_{13}$Cycloalkyl is, for example, cyclohexyl, cycloheptyl, cyclooctyl or cyclododecyl. Preference is given to $C_6$–$C_8$cycloalkyl, in particular cyclohexyl.

$C_1$–$C_4$Alkyl-substituted phenyl or naphthyl, which preferably contains 1 to 3, in particular 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl 2,4,6-triisopropylphenyl, 2,6-diethylphenyl, 2-methylnaphthyl or 1-methylnaphthyl.

An especially preferred carbodiimide is poly(2,4,6-triisopropyl-1,3-phenylenecarbodiimide) of the formula XIa

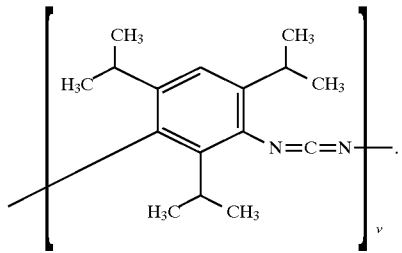

A further especially preferred carbodiimide is commercially available as stabilizer 7000® (manufacturer: Raschig, Germany) of the formula XIb

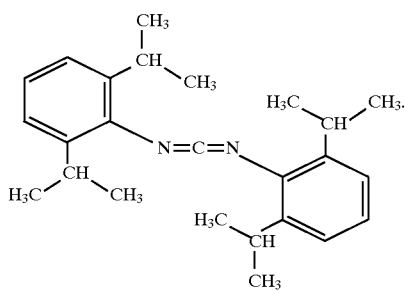

Further suitable carbodiimides are described in EP-A-0 623 589 and in EP-A-0 628 541.

Based on 100 parts of polycondensate, preferably from 0.01 to 5 parts, particularly preferably from 0.02 to 2 parts, in particular from 0.05 to 1 part, of a polyfunctional carbodiimide are employed.

Polyfunctional compounds from the ester class in the sense of this invention are known and are described, for example, in EP-A-0 565 487. Preferred polyfunctional esters are, for example, compounds of the formula XII

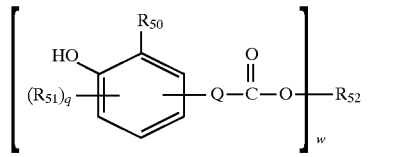

in which
$R_{50}$ is $C_1$–$C_{18}$alkyl, $C_5$–$C_{12}$cycloalkyl, phenyl or $C_7$–$C_9$phenylalkyl,
$R_{51}$ is hydrogen, $C_1$–$C_{18}$alkyl, $C_5$–$C_{12}$cycloalkyl, phenyl or $C_7$–$C_9$phenylalkyl,
q is 0, 1 or 2,
Q is —$C_mH_{2m}$—,

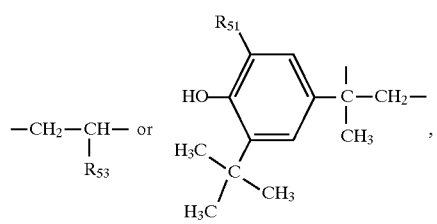

where $R_{51}$ is as defined above,
m is an integer in the range from 0 to 3, $R_{53}$ is $C_1$–$C_8$alkyl, and
w is an integer in the range from 2 to 6, where,
if n=2,
$R_{52}$ is a divalent radical of a hexose, a divalent radical of a hexitol,

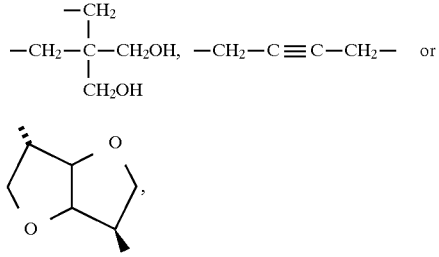

or
if n=3,
$R_{52}$ is a trivalent radical of a hexose, a trivalent radical of a hexitol,

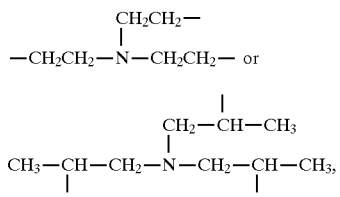

or
if n=4,
$R_{52}$ is a tetravalent radical of a hexose, a tetravalent radical of a hexitol, $C_4$–$C_{10}$alkanetetrayl,

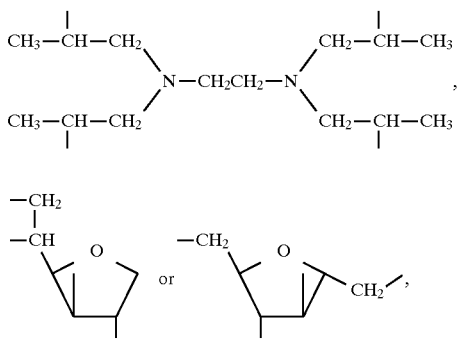

or
if n=5,
$R_{52}$ is a pentavalent radical of a hexose or a pentavalent radical of a hexitol, or
if n=6,
$R_{52}$ is a hexavalent radical of a hexitol or

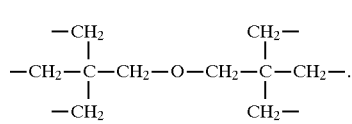

$C_1$–$C_{18}$alkyl is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl. One of the preferred meanings of $R_{50}$ and $R_{51}$ is $C_1$–$C_8$akyl, in particular $C_1$–$C_4$alkyl, for example tert-butyl.

$C_5$–$C_{12}$cycloalkyl is, for example, cyclopentyl, cyclohexyl, cycloheptyl, cyclooctyl, cyclodecyl or cyclododecyl. One of the preferred meanings of $R_{50}$ and $R_{51}$ is $C_5$–$C_7$cycloalkyl. Particular preference is given to cyclohexyl.

$C_7$–$C_9$phenylalkyl is, for example, benzyl, α-methylbenzyl, α,α-dimethylbenzyl or 2-phenylethyl. Benzyl is preferred.

If, for w=2 to 6, $R_{52}$ is a w-valent radical of a hexose, this is derived, for example, from allose, altrose, glucose, mannose, gulose, idose, galactose or talose, i.e. in order to obtain the corresponding compounds of the formula XII, one, two, three, four, five or six —OH groups must be replaced by the ester group E-1,

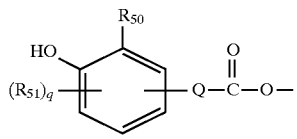  (E-1)

in which $R_{50}$, $R_{51}$, q and Q are as defined above. For example, $R_{52}$ can, for w=5, be a

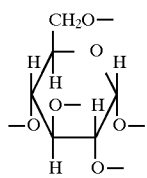

group.

If $R_{52}$ is the w-valent radical of a hexitol, the corresponding compounds of the formula XII are obtained by replacing w —OH groups by the abovementioned ester group E-1. $R_{52}$ can, as a hexavalent radical of a hexitol be, for example,

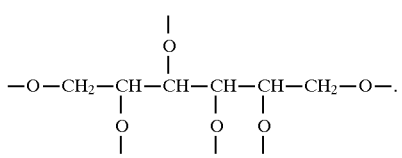

This group is derived from D-sorbitol.

Preferred compounds of the formula XII are also, for example,

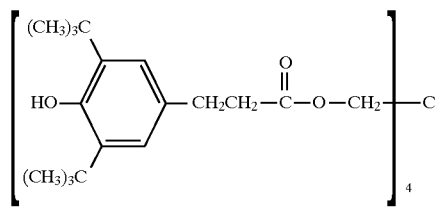

-continued

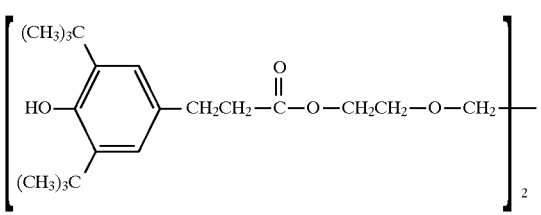

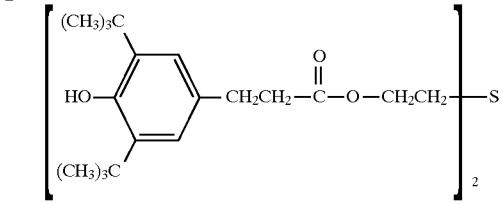

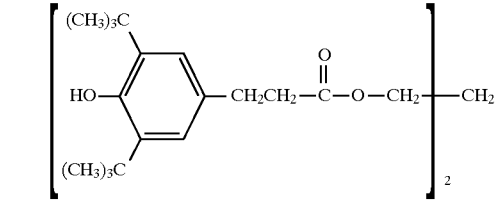

or

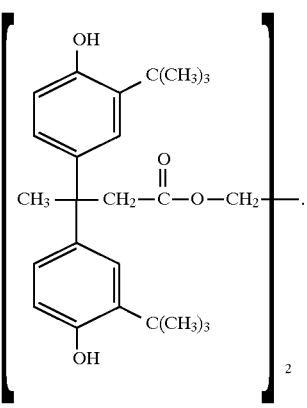

A particularly preferred compound of the formula XII is pentaerythrityl tetrakis[3-(3,5-di-tert-butyl-4-hydroxyphenyl)propionate] [Irganox® 1010 (Ciba-Geigy AG)].

Based on 100 parts of polycondensate, preferably from 0.01 to 5 parts, particularly preferably from 0.02 to 2 parts, in particular from 0.05 to 1 part, of a polyfunctional ester are employed.

It may also be possible to employ a mixture of various polyfunctional compounds.

In addition to the sterically hindered hydroxyphenylalkylphosphonic ester or monoester and the polyfunctional compound, further stabilizers can be added to the polycondensate. These further stabilizers are known in general terms to the person skilled in the art and are selected with respect to the specific requirements of the final product. In particular, light stabilizers or antioxidants or further antioxidants can be added ("Plastics Additives Handbook", Ed. R. Gächter and H. Müller, Hanser Verlag, 3rd Edn., 1990; in particular pp. 88/89, 92/94, 251/252 and 258/259). It is likewise possible to add further additives, for example lubricants, mould-release agents, fillers or reinforcing materials, for example glass fibres, flameproofing agents, antistatics and, in particular in the case of PBT/PC recyclates, additives which prevent transesterification during processing.

The following may be mentioned as being particularly suitable:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methyl-undec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-do-decylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Chroman derivatives of the formula,

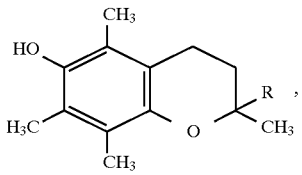

where R is
—(CH$_2$)$_3$—CH(CH$_3$)—(CH$_2$)$_3$—CH(CH$_3$)—(CH$_2$)$_3$—CH—(CH$_3$)$_2$ or —CH$_2$—CH$_2$—O—C(O)—Z, and Z is C$_1$-C$_{18}$alkyl, —CH$_2$—CH$_2$—S—C$_1$-C$_{18}$alkyl or

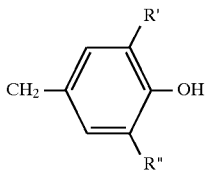

and R' and R" are
hydrogen, methyl or tert-butyl, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmer-captobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis-[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-di-methylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β(3-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$—, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis (4-tert-butylbenzoyl)resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4, Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate and N-β-carbomethoxy-β-cyanovinyl)-2-methylindoline.

2.5. Nickel compounds, for example nickel complexes of 2,2'-thio-bis-[4-(1,1,3,3-tetra-methylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octyl-amino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis-(2,2,6,6 -tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxylphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)-thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

Particular preference is given to the following phosphites: tris-(2,4-di-tert-butylphenyl)phosphite;

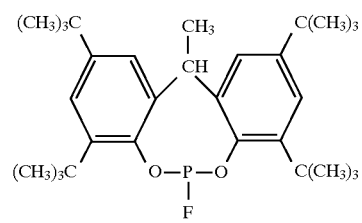

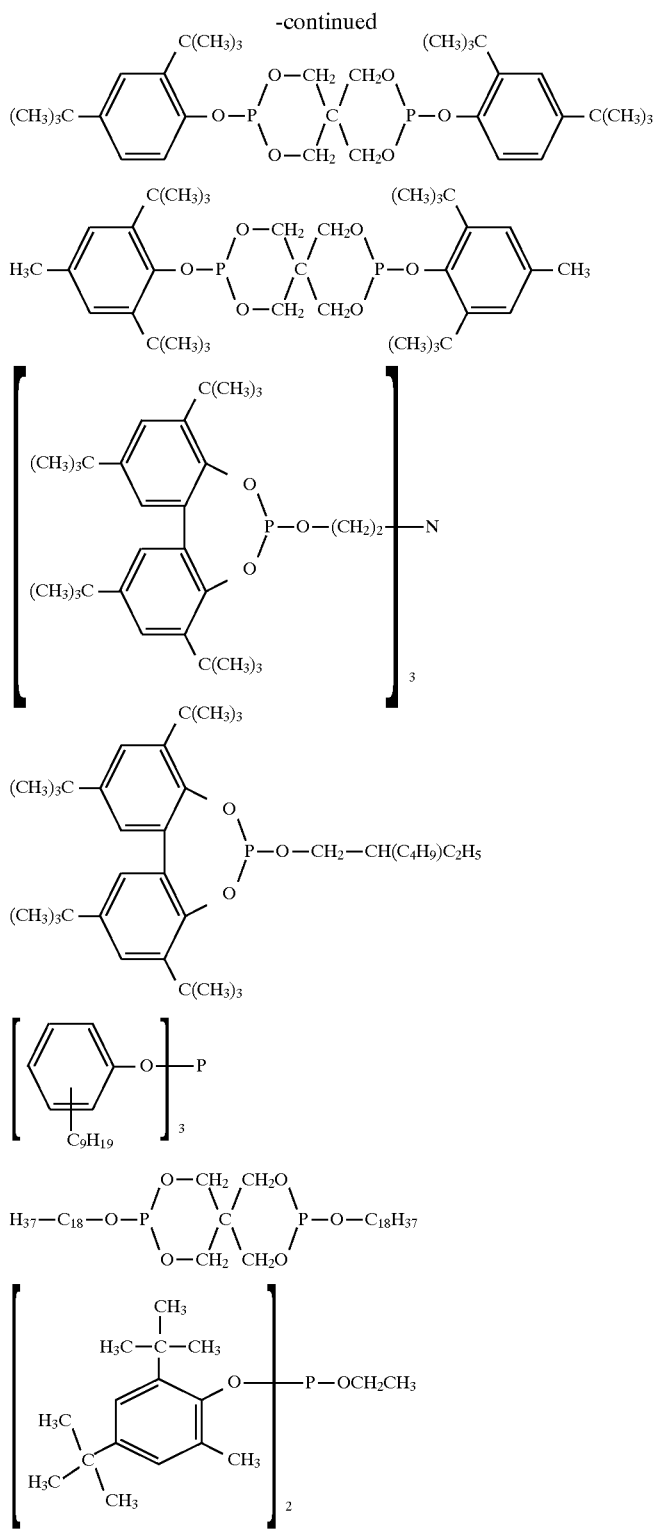

Very particular preference is given to tris(2,4-di-tert-butylphenyl)phosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

Preference is given here to light stabilizers from classes 2.1, 2.6 and 2.7, for example light stabilizers of the Chimassorb 944, Chimassorb 119, Tinuvin 234, Tinuvin 312, Tinuvin 622 and Tinuvin 770 type. Preference is furthermore given to aromatic phosphites and phosphonites.

The solid-phase postcondensation is carried out in a known manner. Reference is made in this respect to EP-A-0 090 915 or the article by S. A. Jabarin et al., Journal of Applied Polymer Science, Vol. 32, 5315–5335 (1986). In the novel process, the polycondensate is heated to a temperature from about 100° to 5° C. below the melting point. In the particularly preferred novel process, the polycondensate is heated to a temperature of from about 60° to 5° C., in particular from 40° to 5° C., below the melting point. In this temperature range, the polycondensate is treated in a stream of inert gas or under vacuum until the desired high viscosity or, if desired, branching, crosslinking or partial crosslinking of the polycondensate has been achieved.

The sterically hindered hydroxyphenylalkylphosphonic ester or monoester and the polyfunctional compound selected from the class consisting of the epoxides, oxazolines, oxazolones, oxazines, isocyanates, anhydrides, acyllactams, maleimides, alcohols, carbodiimides and esters can, independently of one another, be, for the addition, in the form of liquids, powders, granules or in compacted form or alternatively on a support material, such as silica gel or together with a polymer powder or wax, such as a polyethylene wax.

From 0.01 to 5 parts of a sterically hindered hydroxyphenylalkylphosphonic ester or monoester or from 0.01 to 5 parts of a sterically hindered hydroxyphenylalkylphosphonic ester or monoester and from 0.01 to 5 parts of a polyfunctional compound selected from the class consisting of the epoxides, oxazolines, oxazolones, oxazines, isocyanates, anhydrides, acyllactams, maleimides, alcohols, carbodiimides and esters are preferably added per 100 parts of polycondensate. From 0.02 to 2 parts, in particular from 0.05 to 1 part, of a sterically hindered hydroxyphenylalkylphosphonic ester or monoester or from 0.02 to 2 parts, in particular from 0.05 to 1 part, of a sterically hindered hydroxylphenylalkylphosphonic ester or monoester and from 0.02 to 2 parts, in particular from 0.05 to 1 part, of a polyfunctional compound selected from the class consisting of the epoxides, oxazolines, oxazolones, oxazines, isocyanates, anhydrides, acyllactams, maleimides, alcohols, carbodiimides and esters are particularly preferably employed.

The amount of sterically hindered hydroxyphenylalkylphosphonic ester or monoester and polyfunctional compound selected from the class consisting of the epoxides, oxazolines, oxazolones, oxazines, isocyanates, anhydrides, acyllactams, maleimides, alcohols, carbodiimides and esters depends on the initial molecular weight of the polymer and on the final molecular weight desired. For example, for a severely damaged polycondensate, i.e. of low molecular weight, preference is given to a sterically hindered hydroxyphenylalkylphosphonic ester or monoester or a sterically hindered hydroxyphenylalkylphosphonic ester or monoester and the polyfunctional compound selected from the class consisting of epoxides, oxazolines, oxazolones, oxazines, isocyanates, anhydrides, acyllactams, maleimides, alcohols, carbodiimides and esters in the upper weight range. If, by contrast, only a slight increase in molecular weight is desired, the additive or additives is/are employed in low concentrations.

If a crosslinked or partially crosslinked, i.e. insoluble, polycondensate is desired, a relatively high concentration of the polyfunctional compound containing more than two reactive groups in the molecule is preferably employed.

It is furthermore possible to control the final molecular weight and the degree of crosslinking via the reaction time and via the temperature.

If the polycondensate is a recyclate, it can also be mixed with fresh material or employed together with fresh material, for example in a coextrusion process. Stabilization and molecular weight increase can in this case be carried out independently of one another.

The invention furthermore relates to the use of a sterically hindered hydroxyphenylalkylphosphonic ester or monoester for increasing the molecular weight of a polycondensate. The preferences regarding the use correspond to those for the process.

The invention furthermore relates to the use of a mixture comprising at least one sterically hindered hydroxyphenylalkylphosphonic ester or monoester and a polyfunctional compound selected from the class consisting of the epoxides, oxazolines, oxazolones, oxazines, isocyanates, anhydrides, acyllactams, maleimides, alcohols, carbodiimides and esters for increasing the molecular weight of a polycondensate. Tie preferences regarding the use correspond to those for the process.

The invention furthermore relates to a composition comprising a) a polycondensate recyclate, and b) at least one sterically hindered hydroxyphenylalkylphosphonic ester or monoester. The invention furthermore relates to a composition comprising a) a polycondensate recyclate, b) at least one sterically hindered hydroxyphenylalkylphosphonic ester or monoester and c) at least one polyfunctional compound selected from the class consisting of the epoxides, oxazolines, oxazolones, oxazines, isocyanates, anhydrides, acyllactams, maleimides, alcohols, carbodiimides and esters.

The preferences regarding the compositions correspond to those for the process.

The examples below illustrate the invention in greater detail without representing a limitation. Parts and percentages, as in the remainder of the description, relate to the weight, unless otherwise stated.

EXAMPLES 1–6

Molecular weight increase of used PET material by solid-phase condensation.

A used PET material from a bottle collection (origin: Switzerland) is extruded in a twin-screw extruder (Werner+Pfleiderer ZSK 25) at 260° C. with the additives indicated in Table 1, the extrudate is granulated, and the granules are subsequently subjected to solid-phase condensation in a tumble dryer at 230° C. for 23 hours under a vacuum of approx. 1 mbar. The intrinsic viscosity [η] of the polymer is determined using a solution of 1 g of the polymer in 100 g of a 1:1 mixture of o-dichlorobenzene and phenol at 30° C. The results are shown in Table 1. The higher the intrinsic viscosity, the greater the increase in molecular weight. The note "insoluble" in the "intrinsic viscosity" column means that the intrinsic viscosity could not be measured since 1 g of the polymer was not soluble in 100 g of a 1:1 mixture of o-dichlorobenzene and phenol at 30° C.

TABLE 1

| | | Intrinsic viscosity [η] in [dl/g] | |
|---|---|---|---|
| Example | Additives | after extrusion | after solid-phase condensation |
| 1 | — | 0.44 | 0.89 |
| 2 | 0.25% of Irganox 1425 | 0.47 | 1.08 |
| 3 | 0.25% of Irganox 1222 | 0.51 | 1.18 |
| 4 | 0.25% of Irganox 1425 0.25% of Irganox 1010 | 0.47 | 1.18 |
| 5 | 0.25% of Irganox 1425 0.25% of pentaerythritol | 0.48 | insoluble |
| 6 | 0.25% of Irganox 1425 0.25% of Araldit GT 6071 | 0.46 | insoluble |

Table 1 shows a clear increase in the intrinsic viscosity for Examples 2 to 6 according to the invention, indicating an increase in the molecular weight.

Irganox®1222 (Ciba-Geigy) is a compound of the formula II.

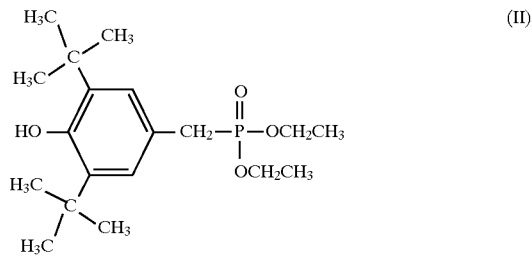

(II)

Irganox®1425 is a compound of the formula III.

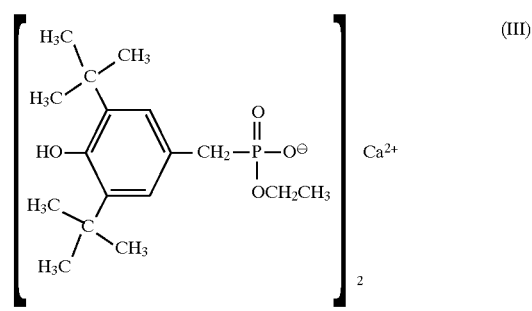

(III)

Irganox®1010 (Ciba-Geigy) is pentaerythrityl tetrakis-[3-(3,5-di-tert-butyl-4-hydroxyphenyl)propionate].

Araldit®GT 6071 (Ciba-Geigy) is bisphenol A diglycidyl ether having an epoxide number of 2.15–2.22 eq/kg and a softening range of 70°–75° C.

EXAMPLES 7 and 8

Molecular weight increase of used PET material by solid-phase condensation.

A used PET material from a bottle collection (origin: Switzerland) is extruded in a twin-screw extruder (Werner+Pfleiderer ZSK 45) at 280° C. with the additives indicated in Table 2, the extrudate is granulated, and the granules are subsequently subjected to solid-phase condensation in a tumble dryer at 230° C. for 23 hours under a vacuum of approx. 1 mbar. The intrinsic viscosity [η] of the polymer is determined analogously to Examples 1 to 6 using a solution of 1 g of the polymer in 100 g of a 1:1 mixture of o-dichlorobenzene and phenol at 30° C. The results are shown in Table 2. The higher the intrinsic viscosity, the greater the increase in molecular weight. The note "crosslinked" in the "intrinsic viscosity" column means that the intrinsic viscosity could not be measured since 1 g of the polymer was not soluble in 100 g of a 1:1 mixture of o-dichlorobenzene and phenol at 30° C.

TABLE 2

| Example | Additives | after extrusion | after solid-phase condensation at 230° C. | | | | |
|---|---|---|---|---|---|---|---|
| | | | 1 hour | 3 hours | 5 hours | 10 hours | 23 hours |
| 7 | — | 0.70 | 0.71 | 0.76 | 0.81 | 0.91 | 1.10 |
| 8 | 0.20% of Irganox 1425<br>0.50% of Araldit GT 6071 | 0.66 | 0.73 | 0.83 | crosslinked | crosslinked | crosslinked |

What is claimed is:

1. A process for increasing the molecular weight of a polycondensate, which comprises heating a polycondensate in the temperature range below the melting point and above the glass transition temperature in the solid phase of the polymer with the addition of at least one sterically hindered hydroxyphenylalkylphosphonic ester or monoester of formula I $$\text{HO}-\underset{R_2}{\overset{R_1}{\text{C}_6\text{H}_2}}-(\text{CH}_2)_p-\overset{\overset{O}{\|}}{\underset{OR_3}{P}}-OR_4 \quad (I)$$

in which
$R_1$ is isopropyl, tert-butyl, cyclohexyl or cyclohexyl which is substituted by 1–3 $C_1$–$C_4$alkyl groups,
$R_2$ is hydrogen, $C_1$–$C_4$alkyl, cyclohexyl or cyclohexyl which is substituted by 1–3 $C_1$–$C_4$alkyl groups,
$R_3$ is $C_1$–$C_{20}$alkyl, or unsubstituted or $C_1$–$C_4$alkyl-substituted phenyl or naphthyl,
$R_4$ is hydrogen, $C_1$–$C_{20}$alkyl, unsubstituted or $C_1$–$C_4$alkyl-substituted phenyl or naphthyl; or is $$\frac{M^{r+}}{r},$$

$M^{r+}$ is an r-valent metal cation,
n is 1, 2, 3, 4, 5 or 6, and
r is 1, 2 or 3.

2. A process according to claim 1, wherein at least one polyfunctional compound selected from the class consisting of the epoxides, oxazolines, oxazolones, oxazines, isocyanates, anhydrides, acyllactams, maleimides, alcohols, carbodiimides and esters is additionally employed.

3. A process according to claim 2, wherein the polyfunctional compound from the epoxide class is a compound containing epoxide radicals of the formula IV $$-\underset{R_5}{\overset{}{CH}}-(CH_2)_p-\underset{R_6}{\overset{}{C}}\overset{O}{\underset{R_7}{\diagdown}}CH. \quad (IV)$$

in which, when $R_5$ and $R_7$ are hydrogen, $R_6$ is hydrogen or methyl and p=0; or, when $R_5$ and $R_7$ together are —$CH_2$—$CH_2$— or —$CH_2$—$CH_2$—$CH_2$—, $R_6$ is hydrogen and p=0 or 1, where these radicals are bonded directly to carbon, oxygen, nitrogen or sulfur atoms.

4. A process according to claim 2, wherein the polyfunctional compound from the alcohol class is pentaerythritol or dipenaerythritol.

5. A process according to claim 2, wherein the polyfunctional compound from the ester class is pentaerythrityl tetiakis[3-(3,5-di-tert-butyl-4-hydroxyphenyl)propionate].

6. A process according to claim 2, wherein from 0.01 to 5 pails of the polyfunctional compound are employed per 100 parts of polycondensate.

7. A process according to claim 1, wherein the polycondensate is a recycled polycondensate.

8. A process according to claim 1, wherein the sterically hindered hydroxyphenylalkylphosphonic ester or monoester is a compound of the formula II or III $$\text{(II)}$$

$$\text{(III)}$$

9. A process according to claim 1, wherein the polycondensate is a polyamide, a polyester, a polycarbonate or a copolymer of these polymers.

10. A process according to claim 1, wherein the polycondensate is a polyamide or a corresponding recyclate or copolymer thereof.

11. A process according to claim 1, wherein the polycondensate is a polycarbonate.

12. A process according to claim 1, wherein the polycondensate is a PET.

13. A process according to claim 1, wherein from 0.01 to 5 parts of the sterically hindered hydroxyphenylalkylphosphonic ester or monoester are employed per 100 parts of polycondensate.

14. A process according to claim 1, wherein the polycondensate is heated at from 100° to 5° C. below the melting point in the solid phase.

* * * * *